United States Patent [19]
Guillet et al.

[11] Patent Number: 5,466,729
[45] Date of Patent: Nov. 14, 1995

[54] AQUEOUS SILYLATED EPOXY RESIN DISPERSION FROM SECONDARY SILANES

[75] Inventors: Antoine J. E. Guillet, Divonne-Les-Bains, France; Remy C. H. Gauthier, Geneva, Switzerland

[73] Assignee: OSi Specialties, Inc., Danbury, Conn.

[21] Appl. No.: 327,340

[22] Filed: Oct. 21, 1994

Related U.S. Application Data

[63] Continuation of Ser. No. 38,027, Mar. 29, 1993, abandoned.
[51] Int. Cl.$^6$ .......................... C08G 59/50; C08G 59/40; C03C 25/02; C08J 3/03
[52] U.S. Cl. .......................... 523/421; 523/425; 427/220; 427/221; 427/302; 427/384; 427/386
[58] Field of Search .......................... 427/220, 221, 427/302, 386, 384; 523/421, 425

[56] References Cited

U.S. PATENT DOCUMENTS

| | | | |
|---|---|---|---|
| 3,211,684 | 10/1965 | Eakins | 260/29.2 |
| 3,252,825 | 5/1966 | Marzocchi et al. | 528/27 |
| 3,505,269 | 4/1970 | Jeffery et al. | 260/32.8 |
| 3,813,351 | 5/1974 | Thomson | 260/2 |
| 3,847,860 | 11/1974 | Seiler et al. | 260/38 |
| 4,075,153 | 2/1978 | Leo | 428/416 |
| 4,148,772 | 4/1979 | Marchetti et al. | 260/29.2 |
| 4,330,444 | 5/1982 | Pollman | 523/404 |
| 4,410,645 | 10/1983 | Das et al. | 523/206 |
| 4,455,400 | 6/1984 | Johnson | 523/454 |
| 4,614,766 | 9/1986 | Schimmel et al. | 525/104 |
| 4,623,697 | 11/1986 | Chang et al. | 525/61 |
| 4,631,322 | 12/1986 | Isayama et al. | 525/480 |
| 4,637,956 | 1/1987 | Das et al. | 428/391 |
| 4,657,986 | 4/1987 | Isayama et al. | 525/407 |
| 4,755,251 | 7/1988 | Cline et al. | 156/315 |
| 4,988,778 | 1/1991 | Chang et al. | 525/476 |
| 5,013,771 | 5/1991 | Guillet et al. | 523/202 |

FOREIGN PATENT DOCUMENTS

| | | |
|---|---|---|
| 0216320 | 4/1987 | European Pat. Off.. |
| 0320861 | 6/1989 | European Pat. Off.. |
| 2046282 | 11/1980 | United Kingdom. |

OTHER PUBLICATIONS

Chiang, C., "Spectroscopic Characterization of the Matrix–Silane Coupling Agent Interface in Fiber–Reinforced Composites", *J. Polymer Science:* Polymer Physics Edition, vol. 20 (1982), pp. 2135–2143.

Dibenedetto, A. T., "Thermomechanical Stability of Interphases in Glass Reinforced Composites", *Mat. Res. Soc. Sym. Proc.*, vol. 170 (1990), pp. 297–302.

Duffy, J. V., "The Effect of Steric Hindrance on Physical Properties in an Amine–cured Epoxy", *J. Applied Polymer Science*, vol. 35 (1988), pp. 1367–1375.

Serier, A., "Reactions in Aminosilane–Epoxy Prepolymer Systems, I. Kinetics of Epoxy–Amine Reactions", *J. Polymer Science:* Part A. Polymer Chemistry, vol. 29 (1991), pp. 209–218.

1991 American Chemical Society CA84(26): 187491k; CA91(16): 132109f; CA91(20): 166387k; CA93(2): 16928q; CA95(22): 187982y; 1992 American Chemical Society CA114(20): 186881p.

CA Selects: Organosilicon Chemistry, Issue 11, 1992, 116:218972d.

*Primary Examiner*—Frederick Krass
*Attorney, Agent, or Firm*—Andrew S. Reiskind

[57] ABSTRACT

This invention provides a dispersion composition comprising (a) water and (b) a silylated epoxy resin prepared by reacting (i) a silane having at least two silicon atoms each bearing at least one hydrolyzable group and attached to a secondary amine by a hydrocarbon and (ii) a resin containing at least two epoxy groups and methods of using the dispersion.

6 Claims, No Drawings

AQUEOUS SILYLATED EPOXY RESIN DISPERSION FROM SECONDARY SILANES

This application is a Continuation of prior U.S. application: Ser. No. 08/038,027 Filing Date Mar. 29, 1993, which is abandoned.

FIELD OF THE INVENTION

The present invention relates to an aqueous dispersion comprising a silylated epoxy resin and a methods of using it. More particularly, the present invention relates to an aqueous dispersion comprising a silylated epoxy resin and its use in coatings for metal and glass and in adhesives.

BACKGROUND OF THE INVENTION

Epoxy resins in use today are limited by the ability to form a dispersion in water. It is highly desirable to have epoxy resins available in a form that is water stable and can be easily dispersed in water. Further, it is desirable to disperse the epoxy resins without the requirement of ionic or salt components such as carboxylic acids or amine salts that damage or corrode inorganic surfaces such as metal and glass. Also, it is desirable to avoid the use of dispersing aids such as nonionic, anionic, and cationic surfactants, since these surfactants interfere with the film forming properties of the epoxy resin. Furthermore, the avoidance of organic solvents is desirable because it reduces volatile organic compound emissions to the workplace and the environment and provide greater safety in the workplace because of reduced flammability and toxicity during production. Hence, there is an on-going need to provide epoxy resins that are easily dispersed in water.

Common uses for these dispersions of epoxy resins are as ingredients in coatings for inorganic surfaces, such as siliceous materials, metals or metal oxides and in adhesives. Coatings produced from dispersions of epoxy resins are used to protect the surface from abrasion and corrosion.

A typical use for these dispersions of epoxy resins is as ingredients in glass fiber coatings, often referred to as "sizes". Glass fibers are produced by melting glass in a furnace and allowing it to flow through small holes in a platinum/rhodium plate usually referred to as a bushing. After the molten glass passes through the holes it is cooled and drawn onto a collecting device at a very high rate of speed. During this process, there is considerable glass-to-glass abrasion or friction which can cause significant weakening of the glass fibers. To protect the glass fibers from abrasion, a sizing composition is applied to the glass fibers using an applicator as the fibers are drawn and before they are wound on the collector. These dispersions of epoxy resins also impart other desirable properties to the glass fibers, such as binding or gluing the individual fiber filaments into a fiber strand, improving fiber handling or processing to make a fiber reinforced plastic composite or improving the wetting out of the fiber with the resin that is used to make a composite.

In the fiber glass art a size that is water based is generally preferred because of its ease of application to glass fibers as well as the greater safety associated with lower flammability and absence of volatile organic components.

SUMMARY OF THE INVENTION

In accordance with the present invention there is provided a dispersion composition comprising (a) water and (b) a silylated epoxy resin composition prepared by reacting (i) a silane having at least two silicon atoms each bearing at least one hydrolyzable group and attached to a secondary amine by a hydrocarbon moiety and (ii) a resin containing at least two epoxy groups. Additional embodiments of the present invention include a coating for inorganic surfaces comprising the dispersion composition, a fiber glass size comprising the dispersion composition and a method for sizing glass fibers with the dispersion.

DETAILED DESCRIPTION OF THE INVENTION

The dispersion of the present invention comprises water and a silylated epoxy resin composition prepared by reacting a silane having at least two silicon atoms each atom bearing at least one hydrolyzable group and attached to a secondary amine by a hydrocarbon moiety with a resin containing at least two epoxy groups.

SILANE

Silanes which are employed to prepare the silylated epoxy resin composition of the dispersion of this invention are aminoalkyl silanes. The aminoalkyl silanes employed in the dispersion are secondary aryl, aralkyl or alkyl-substituted amines attached via one or more carbon chains to at least two alkylalkoxysilyl or alkoxysilyl groups. Preferably, the aminoalkyl silane has the formula:

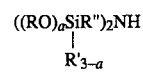

wherein a is 1, 2, or 3; each R and R' is an alkyl group having 1 to 6 carbon atoms; and R" is selected from the group consisting of (i) an alkylene having 3 to 8 carbon atoms, (ii) an arylalkyl group having 7 to 10 carbon atoms, and (iii) an aryl group having from 6 to 10 carbon atoms.

Illustrative aminoalkyl silanes include, for example, bis-N,N-( 3-(trimethoxysilyl)propyl)amine, bis-N,N-(3-(triethoxysilyl)propyl)amine, bis-N,N-(3-(triisopropoxysilyl)propyl)amine, bis-N,N-(3-dimethoxymethylsilyl)propyl)amine, bis-N, N-(3-ethoxydimethylsilyl)propyl)amine, bis-N,N-(p-(trimethoxysilyl)phenyl)amine, bis-N, N-(p-( 3-(trimethoxysilyl)propyl)phenyl)amine, bis-N,N-(p-(3-(diethoxymethylsilyl)propyl)phenyl)amine, bis-N, N-(p-(2-( triethoxysilyl)ethyl)phenyl )amine, bis-N,N-(p-( 3-(triethoxysilyl)propyl)benzyl)amine, bis-N,N-(p-(2-(dimethoxymethylsilyl)ethyl)benzyl)amine or N-(p-(2-(trimethoxysilyl)ethyl)phenyl-N-(3-(trimethoxysilyl)propyl)amine.

EPOXY RESIN

Epoxy resins useful in the preparation of the silylated epoxy resin composition of the dispersion of the present invention contain at least two epoxide rings. In general, epoxy resins which can be employed in the preparation of the silylated epoxy resin composition have a molecular weight of at least about 140, preferably the molecular weight ranges from about 140 to 500 and the epoxy resin equivalent weight ranges from about 50 to 500, preferably from about 100 to 200. Such epoxy resins can include, for example, aliphatic and cyclic aliphatic epoxy resins (also known as cycloaliphatic epoxides), polyglycidyl esters of polycarboxylic acids, aromatic polyglycidyl amines, polyglycidyl ethers of phenols, polyglycidyl ethers of phenolic novolac resins, mixtures thereof, and the like.

Illustrative aliphatic epoxy resins can include, for example, are the polyglycidyl ethers of polyhydridic alcohols based on polyhydridic alcohols such as ethylene glycol, diethylene glycol, triethylene glycol, 1,2-propylene glycol, 1,3-propylene glycol, 1,5-pentanediol, 1,2,6-hexanetriol, glycerol, bis-(4-hydroxycyclohexyl)-2,2-propane, and the like.

Cyclic aliphatic epoxy resins can include, for example, 3,4-epoxycyclohexylmethyl-3,4-epoxycyclohexanecarboxylate, vinyl cyclohexene dioxide, 2-(3,4-epoxycyclohexyl-5,5-spiro-3,4-epoxy)cyclohexane-meta dioxane and bis-(3,4-epoxycyclohexyl)adipate.

Polyglycidyl ethers of phenolic novolac resins that can be employed in the present invention can include, for example, bis-(4-hydroxyphenyl)methane and Bisphenol F.

Illustrative polyglycidyl esters of polycarboxylic acids can include, for example, bis-(2,3-epoxypropyl)phthalate and bis-(2,3-epoxypropyl)adipate.

Suitable aromatic polyglycidyl amines for use in the preparation of silylated epoxy resins can include, for example, para-(N,N-bis-(2,3-epoxypropyl)amino-O-(2,3-epoxypropyl)phenyl and p-(N,N-bis-(2,3-epoxypropyl)amino)-O-(2,3-epoxypropyl)phenol and bis-N,N-(p-O-(2', 3'-epoxypropyl)phenoxy-N-(2,3-epoxypropyl)amine.

Epoxy resins useful in the present invention also include polyglycidyl ethers of phenols, including polyphenols. Polyglycidyl ethers of phenols, including bis-phenols, are produced by the esterification of a phenol with an epihalohydrin in the presence of an alkali metal. Illustrative of these phenols are bisphenols such as Bisphenol A and Bisphenol B. Other suitable polyphenolic compounds can include bis-(4-hydroxyphenyl)-2,2-propane, 4,4'-dihydroxybenzophenone, bis-(4-hydroxyphenyl)-1,1-ethane, bis-(4-hydroxyphenyl)-1,1-isobutane, bis-(4-hydroxytertiarybutylphenyl)-2,2-propane, bis-(2-hydroxynaphthyl)methane, 1,5-dihydroxynaphthalene and the like.

In some applications it may be desirable to employ such polyglycidyl ethers of phenols having higher molecular weight (ranging from about 400 to 3000). This is accomplished by reacting the polyglycidyl ethers described herein above with a specified amount of a polyphenol such as Bisphenol A and capping with epihalohydrin if needed to ensure at least two epoxy groups per molecule of resin.

Silylated Epoxy Resin and Reaction to Form It

To prepare the silylated epoxy resin employed in the dispersion of the present invention an aminoalkyl silane is added to the epoxy resin in the presence of a nitrogen or other dry, inert atmosphere. The reaction is maintained at temperature ranging from about room temperature to 150° C., depending on the particular epoxy resin employed. In general, epoxy resins react with the aminoalkyl silane at room temperature. However, for the reaction utilizing a cycloaliphatic epoxy resin, elevated temperature, about 50° C. to 100° C. is usually required. The silane content of the silylated epoxy resin ranges from about 1 to 50 weight percent, preferably from about 5 to 30 weight percent, based upon the total silylated epoxy resin formed.

Although not generally employed, a solvent can be used to aid in the preparation of a silylated epoxy resin. Protonic solvents and halogenated solvents capable of reacting with the aminoalkyl silane are to be avoided. In some cases, lower molecular weight alcohols, having 1 to 6 carbon atoms, such as methanol and isopropanol can be employed to aid resin preparation.

The silylated epoxy resin reaction product is produced as a result of the reaction between the secondary amine of the silane and one of the epoxy groups of the epoxy resin. In general, up to about fifty percent of the epoxy groups on the epoxy resin are reacted with the aminosilane to produce a 2-hydroxy alkylamine. The final structures of the silylated epoxy resin depends on the particular silane and epoxy resin selected for reaction.

Preparation of the Dispersion

The silylated epoxy resin is dispersed in water using any suitable mixing means known to those skilled in the art, such as, for example, a high speed mixer (about 6000 to 8000 rpm). In general, the silylated epoxy resin is added to the desired amount of water and stirred until the solution is clear. Optionally, a solubilizing agent such as polyvinylpyrolidone available as PVP K90 from GAF Corporation can be added to the water solution along with the silane. After the addition of the silylated epoxy resin, stirring is continued for an additional time, usually for about an hour. The temperature for preparing the dispersion ranges from about 15° C. to about 50° C., preferably from about 25° C. to 40° C. The dispersion of the silylated epoxy resin thus produced is stable until it is used. The dispersion is stable for at least about 72 hours. The dispersion can remain stable for periods of two to three months or longer.

In general the amount of the silylated epoxy resin in the dispersion can range from about 0.1 percent to 80 percent by weight based upon the total weight of the dispersion. Preferably the amount of the silylated epoxy resin ranges from about 1 percent to 65 percent by weight based upon the total weight of the dispersion. Most preferably the amount of the silylated epoxy resin ranges from about 30 to 60 percent by weight based upon the total weight of the dispersion.

The dispersion of this invention may be used for coating any solid inorganic substrate for the purpose of providing chemically and/or mechanically protective coatings, improved adhesion qualities, filler, or lubricating properties.

The solid inorganic substrates that can be treated with the dispersion of the present invention can have any physical form such as, for example, sheets, plates, ribbons, flakes, fibers, particles or powders. The inorganic substrates can include, for example, siliceous materials such as glass, mica, quartz, asbestos, clay, stone, cement, concrete and silicates such as aluminum silicate, calcium aluminum silicate, magnesium silicate, zirconium silicate and the like. The inorganic substrates further include other metals and metal oxides such as, for example, iron, aluminum, copper, iron oxide, aluminum oxide and copper oxide. When employed as a coating, the dispersion of the present invention can be applied to a surface of an inorganic substrate by any means known to those skilled in the art. Such means can include, for example, spraying, rolling, dipping, kiss applications, or mixing of the dispersion and the inorganic substrate. The coated product or article can then be allowed to dry, or drying can be hastened by applying heat to the surface or article.

Use of the Dispersion in Glass Fiber Size

The dispersion may be used to directly prepare a sizing for glass fibers by further diluting in water until a solids level of 0.5 to 20%, preferably 1.0 to 10%, is attained. Alternatively, the dispersion may be used in conjunction with other ingredients commonly found in glass fiber sizes well known to those skilled in the art to prepare a formulated aqueous solutions. Such ingredients can include additional film formers of similar or different composition, lubricants, silane coupling agents, surfactants, emulsifiers, antistat agents, modifiers, and the like.

Whereas the exact scope of the instant invention is set forth in the appended claims, the following specific examples illustrate certain aspects of the present invention and, more particularly, point out methods of evaluating the same. However, the examples are set forth for illustration only and are not to be construed as limitations on the present invention except as set forth in the appended claims. All parts and percentages are by weight unless otherwise specified.

GLOSSARY

Silane A is a 3-aminopropyltriethoxysilane available as A-1100 from Union Carbide Chemicals and Plastics Company, Inc.

Silane B is a bis-N,N-(3-(trimethoxysilyl)propyl)amine available as A-1170 from Union Carbide Chemicals and Plastics Company, Inc.

Epoxy Resin I is a 3,4 epoxycyclohexylmethyl-3,4-epoxycyclohexane carboxylate available as ERL 4221 from Union Carbide Chemicals and Plastics Company, Inc.

Emulsifying Agent Y is a polyethoxylated sorbitin monooleate available as Tween 80 from Imperial Chemicals Industries.

Solubilizing Agent X is a polyvinylpyrolidone available as PVP K90 from GAF.

Epoxy Resin II is a bis-epoxy resin available as Araldite GY 1180 from Ciba Geigy.

EXAMPLES

The examples demonstrate that silylated epoxy resins prepared from an epoxy resin and a secondary amine bearing two silicons with hydrolyzable groups, have superior dispersion characteristics than similar silylated epoxy resins made from an epoxy resin and a primary amine bearing only a single silicon. Example 4 demonstrates that the epoxy resin does not form a stable dispersion even with the help of a dispersant. This surprising ability toward dispersion is emphasized by the fact that no dispersion aid was required for the silylated epoxy resin.

Comparative Example A

Epoxy Resin I (800 g, 3.17 moles) was placed in a 2-liter 2-neck flask. Silane A (80 g, 0.36 moles) was added to the flask at room temperature. The reaction was stirred for 2 hours and then allowed to stand for an additional 24 hours. Water (1020 g, 56.7 moles), Emulsifying Agent Y (30 g) and Solubilizing Agent X (70 g) were placed in a dispersion tank and mixed until a clear solution was achieved. The dispersion speed was adjusted to 7000 RPM and the above silylated epoxy resin added over a period of five minutes. The dispersion mixing was continued for 60 minutes. However, the resulting emulsion precipitated within two hours.

Example I

Epoxy Resin I (800 g, 3.17 moles) was placed in a 2-liter 2-neck flask. Silane B (80 g, 0.24 moles) was added to the flask at room temperature. The reaction was stirred for 2 hours and then allowed to stand for an additional 24 hours. Water (1050 g, 58.3 moles) and Solubilizing Agent X (70 g) were placed in a dispersion tank and mixed until a clear solution was achieved. The dispersion speed was adjusted to 7000 RPM, and the silylated epoxy resin was added over a period of five minutes. The dispersion mixing was continued for 60 minutes. The resulting dispersion was stable and no separation was observed after one week. The dispersion was applied to a glass plate and formed a hard, waxy coating.

Comparative Example B

Epoxy Resin I (400 g, 1.59 moles) was placed in a 1-liter flask. Silane A (40 g, 0.18 moles) was added to the flask. The flask was heated at 70° C. for one hour. Water (525 g, 29.17 moles) and Solubilizing Agent X (35 g) were mixed in a Kinematic high speed dispersor. The solution was stirred until a clear solution was achieved. The silylated epoxy resin was slowly added to the water/solubilizing agent solution over a 15-minute period under high speed agitation (6000 to 8000 RPM). The dispersion was stirred for an additional hour and held cool at 35° C.

The resulting dispersion was unstable and rapidly separated.

Comparative Example C

Epoxy Resin I (400 g, 1.59 moles) was placed in a 1-liter flask. A nonionic emulsifier, Emulsifying Agent Y (20 g) was added to the flask at room temperature and stirred. Water (545 g, 30.28 moles) and Solubilizing Agent X (35 g) were placed in a dispersion tank and mixed until a clear solution was achieved. The dispersion speed was adjusted to 7000 RPM, and the epoxy resin solution added over a period of 15 minutes. The dispersion mixing was continued for 60 minutes. The resulting dispersion was not stable and separated rapidly (in less than 1 hour).

Example 2:. Use of the Dispersion in a Coating for Fiber Glass

Example 2 demonstrates the improved wetting speed of glass fibers treated with dispersions of silylated epoxy resins. The test employed for wetting speed is one commonly used in polyester molding operations. Thus aqueous glass fiber size solutions were prepared by adding the indicated amount of the water dispersed silylated epoxy resin solution to water. E-glass fabric samples of about 10×5 cm were heated in an oven at about 600° C. to remove all organic compounds. They were cooled and then dipped into the aqueous size solutions of Examples 1, B, and C, respectively. They were removed from the solution and hung to dry in a ventilated oven for 15 minutes at 75° C.

The treated fabric samples were tested for wettability by laying them over a printed paper sheet and fixing the samples with magnets. The printing included characters of 8 point size. A drop of a non-catalyzed polyester resin was poured onto the fabric. The readability of the printed text was used as a measure for the degree of wetting. The wetting speed was recorded as the time required for the text to become readable. Each experiment was repeated three times. The lower the time required to read the test, the better the wetting speed.

Table 1 shows the results for the silylated epoxy resin dispersions prepared in Examples 1, B and C. The best wetting speed was shown for the silylated epoxy resin of the dispersion of Example 1.

TABLE 1

| Silylated Epoxy Resin | Concentration in Size Solution | Mean Wetting Time Seconds |
| --- | --- | --- |
| Example 1 | 3% | 86 |
|  | 5% | 93 |
| Example B | 3% | 95 |
|  | 5% | 97 |
| Example C | 3% | 98 |
|  | 5% | 100 |

Example 3: Improved Wetting Using the Dispersion of This Invention

Example 3 demonstrates the improved wetting speed for a silylated epoxy resin when compared to the same epoxy resin that has not been silylated. Thus a novolac epoxy resin, Epoxy Resin II (400 g) was placed in a jacketed reactor under nitrogen, stirred and heated to 120° C. for two hours. Silane B (80 g, 0.36 moles) was slowly added to the resin. A slight exotherm was noted, and the temperature rose to 128° C. The product was then cooled to 105° C. In a separate tank, water (783 g, 43.5 moles) was mixed with Solubilizing Agent X (30 g) and the solution mixed until clear. The hot silylated epoxy resin mix was slowly added to the high speed mixer to form the dispersion. The final dispersion was stable for several months without agglomerating.

The water dispersed silylated epoxy resin was then used to make an aqueous sizing solution for glass fibers. The size solution consisted of 4% of the dispersed silylated epoxy resin, 0.3% Silane A and the remainder was water.

Similarly, Epoxy Resin II (480 g) was mixed with Emulsifying Agent Y (20 g), a nonionic emulsifier. This solution was slowly added to a solution of water (490 g) and Solubilizing Agent X (30 g) in a high speed mixer. The final mixture was immediately used to prepare glass fiber sizing solution consisting of 4% of the Epoxy Resin II solution, 0.3% Silane A, and the remainder water.

The glass fiber size containing the Epoxy Resin II and glass fiber size containing the silylated epoxy resin dispersion were then used to treat glass fiber rovings and used for wetting speed tests.

The wetting speed measurements were carried out using the capillary equilibrium method with a Kruss tensilmeter measuring plate. The glass fibers were pulled into a glass capillary tube with care taken to maintain the glass fiber in a parallel arrangement and packed at a constant density. The glass tubes were suspended from a micro balance. The filled glass tubes were then brought into contact with the measuring liquid. The rise of the liquid front indicated the rise of the measuring liquid in the capillary tube. The wetting speed of the liquid was determined by measuring the increase of the weight as a function of time. The wetting speed is defined as $W^2/t$, where W is the increase in weight in grams and t is time in seconds. It is calculated by a linear regression of the increase in the square of the mass over time. The results for the wetting speeds using methyl ethyl ketone and xylene as the measuring liquids are shown in Table 2. The results show that the wetting speed is better for silylated Epoxy Resin II than for the non-silylated material.

Example 4: Influence of Silane Content in the Silylated Epoxy Resin on Wetting Speed of the Sized Glass Fibers Example 4 shows the improvement in wetting speed for silylated epoxy resins made from Epoxy Resin I. Thus two silylated epoxy resins were made according to the procedure described in Example 1. The first silylated epoxy resin dispersion was prepared by first reacting 10 weight percent Silane B with Epoxy Resin I. The product was then added to water in accordance with the procedure in Example 1 to provide an aqueous dispersion containing 47.5 weight percent solids (Example 4A). The second silylated epoxy resin dispersion was similarly prepared by first reacting 20 weight percent Silane B with Epoxy Resin I. The product was dispersed in water to provide a 40.0 weight percent solids dispersion (Example 4B). A size formulation including 4% dispersed silylated epoxy resin, 0.3% Silane A and water was prepared from each silylated resin and applied to glass fibers. These were then tested for wetting speed in the capillary equilibrium test described above.

The results are listed in Table 2 and demonstrate that the wetting speed for glass fibers treated with the silylated epoxy resin is faster than those treated with only Silane A. Further, increasing the concentration of Silane B also increases the wetting speed for methyl ethyl ketone while the xylene wetting speed remains essentially constant.

TABLE 2

| Aqueous Size Solution | Wetting Speed Methyl Ethyl Ketone | Xylene |
| --- | --- | --- |
| 4.0% Example 3 and 0.3% Silane A | 5.25 | 5.0 |
| 4.0% Comparative Example A and 0.3% Silane A | 3.75 | 5.15 |
| Control, No Epoxy Dispersion, 0.3% Silane A | 2.75 | 2.25 |
| 4% Example 4A and 0.3% Silane A | 3.15 | 3.35 |
| 4% Example 4B and 0.3% Silane A | 4.45 | 3.15 |

What is claimed is:

1. A method for sizing glass fibers which consists essentially of contacting the fibers with a size consisting essentially of a stable dispersion comprising:
   (a) 40–70 weight percent of the total of (a) and (b) of water; and
   (b) and 30–60 weight percent of the total of (a) and (b) of a silylated epoxy resin prepared by reacting:
      (i) a silane having at least two silicon atoms each bearing at least one hydrolyzable group and each silicon atom attached to a secondary amine by a hydrocarbon moiety; and
      (ii) a resin containing at least two epoxy groups at or near room temperature to about 150° C. such that the epoxy resin contains from about 1 to 50 weight percent of silane based on the total silylated epoxy resin, wherein said silane has the formula

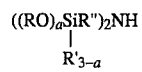

wherein a is 1, 2 or 3; each R abd R' is an alkyl group having 1 to 6 carbon atoms; and R" is selected from the group consisting of (i) 3 to 8 carbon alkylene (ii) 7 to 10 carbon aralkylene and (iii) 6 to 10 carbon arylene.

2. The method according to claim 1, wherein the size additionally consists essentially of a silane coupling agent.

3. A method according to claim 1, wherein the resin containing at least two epoxy groups has a molecular weight of at least about 140.

4. A method according to claim 1 wherein the resin containing at least two epoxy groups is selected from the group consisting of (i) aliphatic and cyclic aliphatic epoxy resins, (ii) glycidyl ethers of phenolic novalac resins, (iii) glycidyl esters of polycarboxylic acids, (iv) aromatic glycidyl amines, (v) polyglycidyl ethers of phenols, and (vi) mixtures thereof.

5. A method according to claim 1 wherein the silane is bis-N,N-(3-trialkyloxysilyl)propyl)amine and the resin containing at least two epoxy groups is a cyclic aliphatic epoxy resin.

6. A method according to claim 1 wherein the silane is bis-N,N-(3-trialkoxylsilyl)propyl)amine and the resin containing at least two epoxy groups is 3,4-epoxycyclohexyl-methyl-3,4-epoxycyclohexane.

* * * * *